(12) United States Patent
Sherrer et al.

(10) Patent No.: US 7,291,833 B2
(45) Date of Patent: *Nov. 6, 2007

(54) OPTOELECTRONIC COMPONENT

(75) Inventors: David W. Sherrer, Radford, VA (US); Noel A. Heiks, Radford, VA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/506,250

(22) Filed: Aug. 18, 2006

(65) Prior Publication Data
US 2006/0278821 A1 Dec. 14, 2006

Related U.S. Application Data

(63) Continuation of application No. 11/124,775, filed on May 9, 2005, which is a continuation-in-part of application No. 10/192,752, filed on Jul. 10, 2002, now abandoned, which is a continuation of application No. 09/574,482, filed on May 19, 2000, now abandoned, which is a continuation-in-part of application No. 09/199,545, filed on Nov. 25, 1998, now abandoned.

(51) Int. Cl.
*H01J 40/14* (2006.01)

(52) U.S. Cl. .................. 250/239; 250/214 R

(58) Field of Classification Search ............ 250/214.1, 250/214 R, 239, 208.1; 257/80–84, 432–435
See application file for complete search history.

(56) References Cited

U.S. PATENT DOCUMENTS

| | | | |
|---|---|---|---|
| 3,648,131 A * | 3/1972 | Stuby | 257/622 |
| 4,104,674 A | 8/1978 | Lorenze, Jr. et al. | |
| 4,826,272 A | 5/1989 | Pimpinella et al. | |
| 4,945,400 A | 7/1990 | Blonder et al. | |
| 5,177,753 A | 1/1993 | Tanaka | |
| 5,259,054 A | 11/1993 | Benzoni et al. | |
| 5,590,232 A | 12/1996 | Wentworth et al. | |
| 5,611,013 A | 3/1997 | Curzio | |
| 5,740,261 A | 4/1998 | Loeppert et al. | |
| 5,812,717 A | 9/1998 | Gilliland | |
| 6,013,948 A * | 1/2000 | Akram et al. | 257/698 |
| 2004/0201028 A1 | 10/2004 | Waitl et al. | |
| 2005/0205771 A1 | 9/2005 | Sherrer et al. | |
| 2005/0218317 A1 | 10/2005 | Sherrer et al. | |

(Continued)

FOREIGN PATENT DOCUMENTS

EP  0 465 230 B1  3/1995

(Continued)

OTHER PUBLICATIONS

Linder et al., "Fabrication Technology for Wafer Through-Hole Interconnections and Three-Dimensional Stacks of Chips and Wafers", IEEE (1994), pp. 349-354.

(Continued)

*Primary Examiner*—Que T Le
(74) *Attorney, Agent, or Firm*—Jonathan D. Baskin

(57) ABSTRACT

Provided are optoelectronic components which include an optoelectronic device mounted on a silicon substrate and a flexible circuit electrically connected to the optoelectronic device.

16 Claims, 13 Drawing Sheets

U.S. PATENT DOCUMENTS

2006/0006313 A1  1/2006  Sherrer et al.

FOREIGN PATENT DOCUMENTS

| GB | 2 312 551 | 10/1997 |
|----|-----------|---------|
| JP | 01134956 A | 5/1989 |
| JP | 09027643 A | 1/1997 |
| WO | WO 98/14813 | 4/1998 |

OTHER PUBLICATIONS

Hashimoto et al., "Multichip Optical Hybrid Integration Technique with Planar Lightwave Circuit Platform", Journal of Lightwave Technology, vol. 16, No. 7, Jul. 1998, pp. 1249-1258.

* cited by examiner

Figure 14
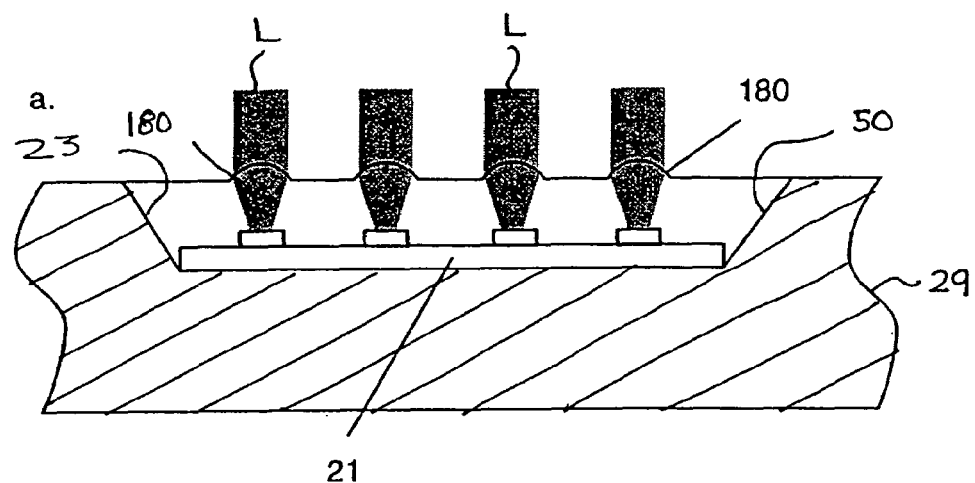
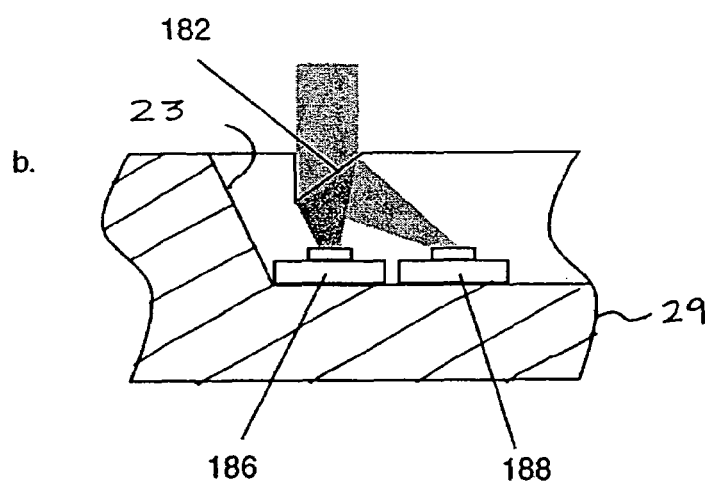

OPTOELECTRONIC COMPONENT

CROSS-REFERENCE TO RELATED APPLICATIONS

This application is a continuation of application Ser. No. 11/124,775, filed May 9, 2005, which is a continuation-in-part of application Ser. No. 10/192,752, filed Jul. 10, 2002 now abandoned, which is a continuation of application Ser. No. 09/574,482, filed May 19, 2000, now abandoned, which is a continuation-in-part of application Ser. No. 09/199,545, filed Nov. 25, 1998, now abandoned. The contents of each of these applications are incorporated herein by reference.

BACKGROUND OF THE INVENTION

To date designs and methods of manufacturing photonics transmit/receive modules have relied on complicated techniques of aligning the light emitting and detecting elements, of encapsulating said elements, and of combining the carrier with an optical connector. This is especially true of arrays combining one or more light emitting or detecting devices in parallel. Attempts at handling Vertical Cavity Surface Emitting Lasers or VCSELs and their arrays, as well as photodetectors and their arrays for use in fiber Tx, Rx and Tx/Rx packages have often involved changing the optical axis of the chips—allowing them to interface with v-grooves in a silicon substrate such as in U.S. Pat. No. 5,337,391. Other groups have employed methods to change the optical axis that employ the use of angle polished fiber or flexible waveguide arrays such as Hewlett Packard's Parallel Optical Link Organization (POLO) [Hahn, K. H. PLOL "Parallel optical links for gigabyte data communications", in the Proceedings of the 45th Electronics Components and Technology Conference Proceedings, pgs. 7-8]. Other designs have involved several complicated parts such as U.S. Pat. No. 5,337,398, or have involved the mounting of devices on an optical jumper block such as U.S. Pat. No. 5,719,978 or on the endface of a polished fiber array block such as in the Motorola Optobus [Schwartz, D. B., C. K. Y. Chun, B. M. Foley, D. H. Hartman, M. Lebby, H. C. Lee, C. L. Sheih, S. M. Kuo, S. G. Shook, and B. Webb, 1995, a low cost, high performance optical interconnect. In the Proceedings of the 45th Electronics Components and Technology Conference, pgs. 376-379. Piscataway, N.J.: IEEE]. All of these references are hereby incorporated by reference herein. One prior attempt at monolithic integration using stacks of self aligned chips utilized ball lenses between the stacks to couple optical fibers to the optically active device as was seen in U.S. Pat. No. 5,259,054.

These earlier methods of handling optically active elements, especially surface emitting or receiving devices as arrays—as well as positioning of discrete components—has been very complex, expensive, and lacking in simplicity of design thus making the designs non usable in the current manufacturing climate. The current invention relates to a new technique for creating a "face-plate" module for handling such active devices. The invention has wide application in making connection to existing and future parallel optical fiber array connectors in its ability to use modified existing ferrules and their alignment mechanisms and accurately align the optical elements of the carrier to the optical fibers.

This eliminates all need for expensive and hard to machine components, costly labor machining and complicated assembly techniques. The device is exceptionally useful for creating cost effective small form factor transceivers and parallel Tx/Rx modules. The invention allows a greater degree of monolithic integration than previously possible and eliminates many of the parts and steps previously required such as optical jumper blocks, polishing operations, etc. Such steps are very expensive to perform and time consuming thus adding to the price of the component member. The invention also will find application in chip to chip and board to board interconnects allowing easier cost effective packaging of the optical elements.

New and existing technologies in micromachining of silicon and other materials allow a greater degree of precision to be obtained in forming cavities and holes in substrates. For example the Bosch process has demonstrated through—wafer etching with excellent control of dimensions at etch rates making new mechanical structures possible. Newer deep dry etching technologies and wet anisotropic technologies—that have already been demonstrated in silicon wafers in conjunction with better encapsulants—make manufacture of these devices possible at this time. It is expected similar etching technologies will become available for other ceramic, glass, injection or transfer molded plastics, and other materials. In addition, parts of the design may find economic manufacture in the future using molding processes, laser machining, light/laser assisted chemical machining, etc.

The devices disclosed are various embodiments of a novel carrier for utilizing one or more optically active devices or elements (here meaning lasers such as VCSELs and VCSEL arrays, photodetectors and photodetector arrays, Light Emitting Diodes or LEDs, Super Luminescent LEDs or SLEDs, etc.) allowing them to be precisely positioned, electrically connected, encapsulated, optionally lensed, and heat sinked. The applications include chip to chip, board to board, and fiber optic and especially fiber optic array transmit, receive and transceiver modules. The approach disclosed can eliminate the need for polishing an assembly to form an optical surface, active alignment of the active optical elements to the carrier, and/or active alignment of the carrier to a connector assembly. Patterned metallizations and solders become incorporated in this design using techniques such as shadow masking, lift-off, selective CVD metal deposition, and can be combined with plating using electroless methods or any of the known electroplating techniques.

SUMMARY OF THE INVENTION

The invention disclosed addresses the previously discussed problems inherent in the prior art by providing a simple, easily manufacturable, passively aligned method of coupling an optoelectronic device to a fiber or fiber array with most steps integrated at the wafer level. The passive and self correcting feature of the alignment method provides for an efficient and simple component to be added onto already existing components thus making its incorporation into the manufacturing process a desirable goal.

In fashioning the present invention, the preferred substrate material is a silicon wafer in which many substrate portions can be machined before being diced or cleaved into many components. Other equivalent material may be substituted only if suitable machining technologies are developed. Machining of silicon is a new art form in the manufacture of electronic components on a mass scale and it is precision work.

In a preferred embodiment of the invention, a substrate comprises part of the subassembly—with a precisely machined or formed trench in which the optoelectronic device is placed and aligned, with metallized bond pads and circuit traces to which the device can be electrically connected, with encapsulant filling the trench to encapsulate the device and provide a molded surface for later optical coupling, and with precisely machined or formed through holes or angled edges which serve as alignment guides for alignment fixtures such as pins to come through. The substrate is then placed onto alignment pins of a fiber optic connector housing and bonded to the housing of the connector while the pins hold the substrate in alignment. The pins may later be removed or left in place. The bonded fiber optic connector can be machined or formed to house a back side heat sink and the electrical leads for the optoelectronic device and possibly drivers mounted in the substrate.

In another embodiment, the trench that houses the optoelectronic device can be machined in the back side of the substrate, and a smaller window can be machined in the front of the substrate for the device to show through. In cases where the light to be transmitted or received is at a wavelength where the substrate is transparent, the front side window need not be machined.

In a further embodiment, alignment trenches or grooves are machined or formed into the front or back surface of the substrate so that a fitted cylindrical or spherical object can be inserted. This mechanism allows a new substrate with the same feature (alignment trench) to be aligned to the cylinder or sphere, thereby to also be aligned to the first substrate.

In yet another embodiment, the circuit traces for the optoelectronic device can extend into and through (perpendicular to the surface) the substrate instead of lying parallel to the front or back surface. This allows for simple front to back side electrical connection. The metallized via holes can also be cut in half, allowing electrical connection access to the surface perpendicular to the surface in which the device is mounted. This feature becomes important when it is desirable to affix a flexible circuit member to the subassembly along the edge of the substrate. This feature also allows direct bonding or secondary substrate mounting with a solder bump connection.

In a still further embodiment, the encapsulant that encapsulates the optoelectronic device can be shaped or altered to form lenses, gratings, mirrors, waveguides or other optical elements. This feature allows for beam shaping and/or the redirection of the light to another optoelectronic or waveguiding device. It should be noted that holes can be machined right through the wafer or substrate for insertion of optical fibers adapted to transmit from one side of the wafer or substrate to the other.

In yet another embodiment, an optoelectronic component is provided. The optoelectronic component includes a substrate having a front surface, a back surface and a trench in the front surface, an optoelectronic device in the trench, and an encapsulant contained within the trench. The encapsulant provides an optical surface.

In yet another embodiment, an optoelectronic component is provided. The optoelectronic component includes a planar silicon substrate having a front surface, a back surface and a trench in the front surface, an optoelectronic device in the trench and an encapsulant covering the optoelectronic device. The encapsulant provides an optical surface.

In yet another embodiment, an optoelectronic component is provided. The optoelectronic component includes a planar substrate having a front surface, a back surface and a trench in the front surface, an optoelectronic device in the trench, an encapsulant covering the optoelectronic device, and an optical element inserted into the encapsulant for focusing or reflecting light, or for altering the light transmission qualities of the encapsulant.

A first object of the invention is to provide a simple means of aligning a single or arrayed surface emitting or receiving optoelectronic device to a single or arrayed fiber optic connector.

It is another object of the invention to provide an encapsulated trench for the device that eliminates the need for polishing.

It is yet another object of the invention to provide an improved optoelectronic module.

It is still another object of this invention to provide a innovative method for producing an improved optoelectronic module.

It is yet another object of this invention to provide a superior alignment guide and component for optoelectronic components utilizing guide pins and or beveled surfaces.

It is still another object to provide an improved alignment component for optoelectronic devices which is incorporated directly into the device.

Yet another object of this invention is to provide a method of making optoelectronic components where a large amount of steps are done facilitating wafer level integration of the method.

Still another object of this invention it to provide an optoelectronic component which provides a passively aligned platform for an active device yet still utilizes existing coupling components thus enhancing saved costs.

Further objects include the use of a one time passive alignment and insertion of an optoelectronic carrier and coupler component to an existing assembly and the provision of a superior assembly.

Other objects of this invention include optimal connections of the component to other components such as heat sinks, IC circuits and the like.

These and other objects will become apparent and will be demonstrated in the following drawings and text showing that the disclosed invention offers an easily manufacturable, passively aligned solution to a photonics packaging problem that has only been solved previously by complex or costly designs.

BRIEF DESCRIPTION OF THE DRAWINGS

FIGS. 14*a* through 11*e* show the methods for providing metallization and, hence, electrical connection, to the back of a substrate with the use of through holes;

FIGS. 14*a* and 14*b* illustrate two embodiments of the encapsulation—where the encapsulant can be precisely formed to shape optical elements;

DETAILED DESCRIPTION

Figure 1:
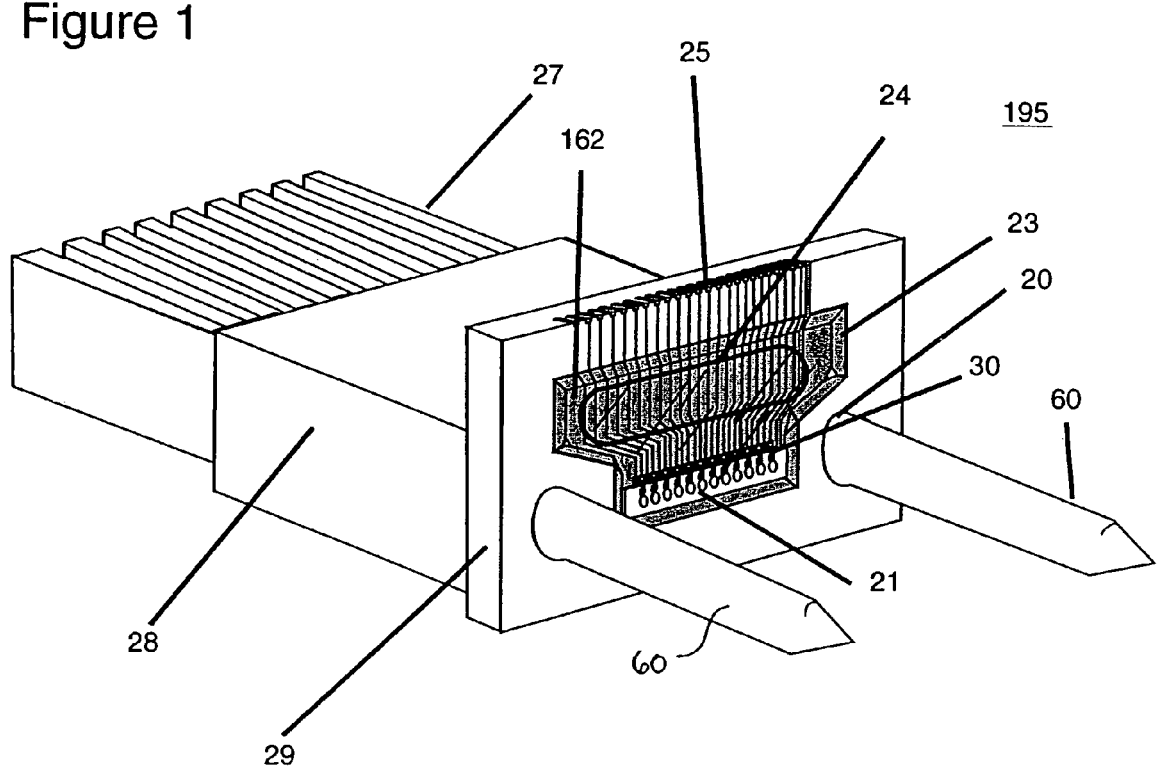
FIG. 1 is a perspective cut-away view of the present invention showing a male connector piece of an optoelectronic subassembly for coupling to the arrayed device on a substrate.

FIG. 1 illustrates a mating part of an optical connector, where the other part of the connector (not shown) is an arrayed or single waveguide or fiber optic connector with fibers or waveguides embedded therein. The connector halves are to be mated by means of the alignment pins 60. The optoelectronic coupler subassembly 195 illustrated is partly comprised of a substrate 29 which has in it a machined or formed trench 23 in which an optoelectronic device 21 is placed, that optoelectronic device being any device which receives or emits light, and especially in, but not limited to, the direction perpendicular to the substrate's 29 front surface. The preferred embodiment of the invention is where the device 21 is a Vertical Cavity Surface Emitting Laser or VCSEL. The device 21 can have ball wire bonds 30 that affix to bond pads on or in the substrate. Electrically conductive traces, bond pads, and solder 24 are deposited onto the surface of the substrate to allow for simple electrical connection from a fanout circuit to the optoelectronic device via ball wire bonds and/or "flip chip" bonding to the traces. The electrically conductive circuits may be metal or may be diffused conductors in the substrate. The bond pads or solder bumps 25 at the top or front of the pictured substrate 29 can be electrically connected to flex circuit, wire bonds, ball grid arrays, or any fitting electrical connector. The trench 23 is injected with an encapsulant 162 which encapsulates the device 21 and can provide a flush, optically flat surface for coupling to the device 21 preferably without the need for polishing. Polishing has been required in the past due to the large amount of machining needed on the surface of the elements. Polished surfaces were needed to insure good face-to-face contact between surfaces and to provide good and complete contact for bonding. The encapsulant can also provide focusing, reflecting, or waveguiding optical elements to redirect light within its confines. The encapsulant can be molded or chemically altered to produce this effect, or a separate optical element can be embedded within its confines. The holes 20 through the substrate 29 are precisely machined or formed to provide precise alignment of the substrate 29 and the device 21 to any alignment pin or tool pushed through the subassembly's holes. Such an alignment tool can be the housing of an optical connector 28 that can have precisely positioned pins 60 for mating to the other half of its connection. The optical connector housing 28 can be machined or formed to accept a heat sink 27 that butts against the back surface of the substrate 29 to conduct heat away from the optoelectronic device 21.

Figure 2:
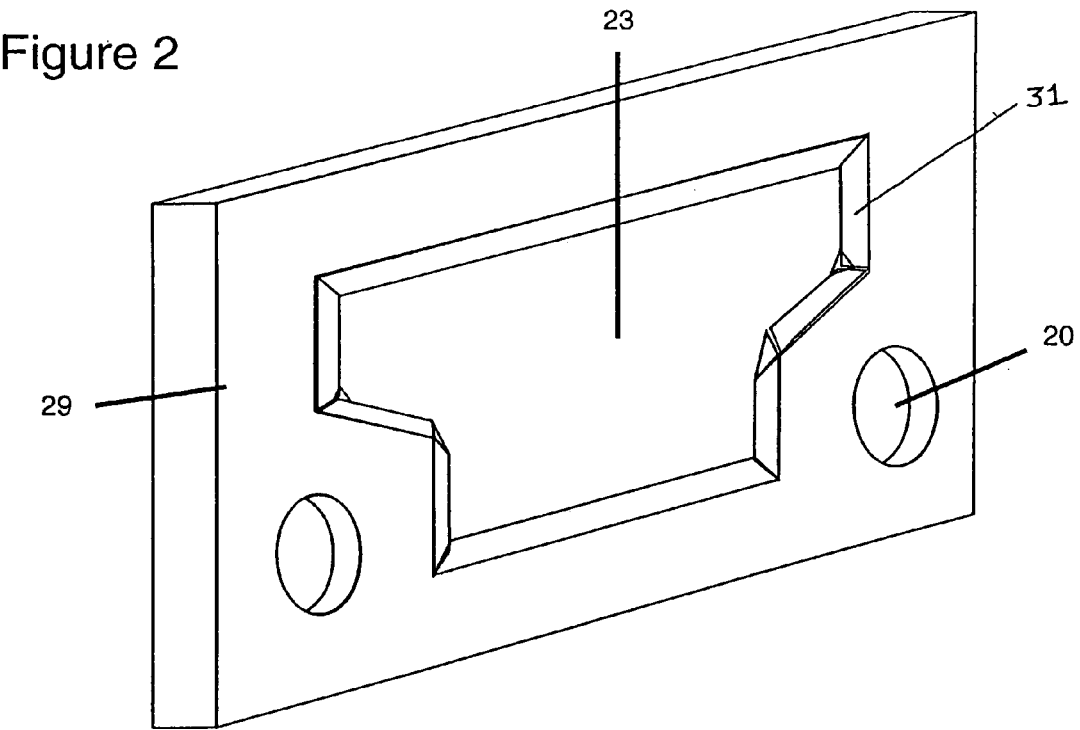
FIG. 2 illustrates a machined or formed trench in a substrate for providing alignment of an optoelectronic device.

FIG. 2 illustrates the substrate 29 with its machined trench 23 and via holes 20. The trench 23 and the via hole 20 can be machined or formed into the substrate 29 so that they are in precise alignment with one another either through a parallel forming or machining mechanism or through a photolithography step that defines both areas at once, or uses precise mask and mask alignment. Trench 23 has beveled sides 31 all around to provide for both a guiding feature and to allow any encapsulant to form correctly.

Figure 3:
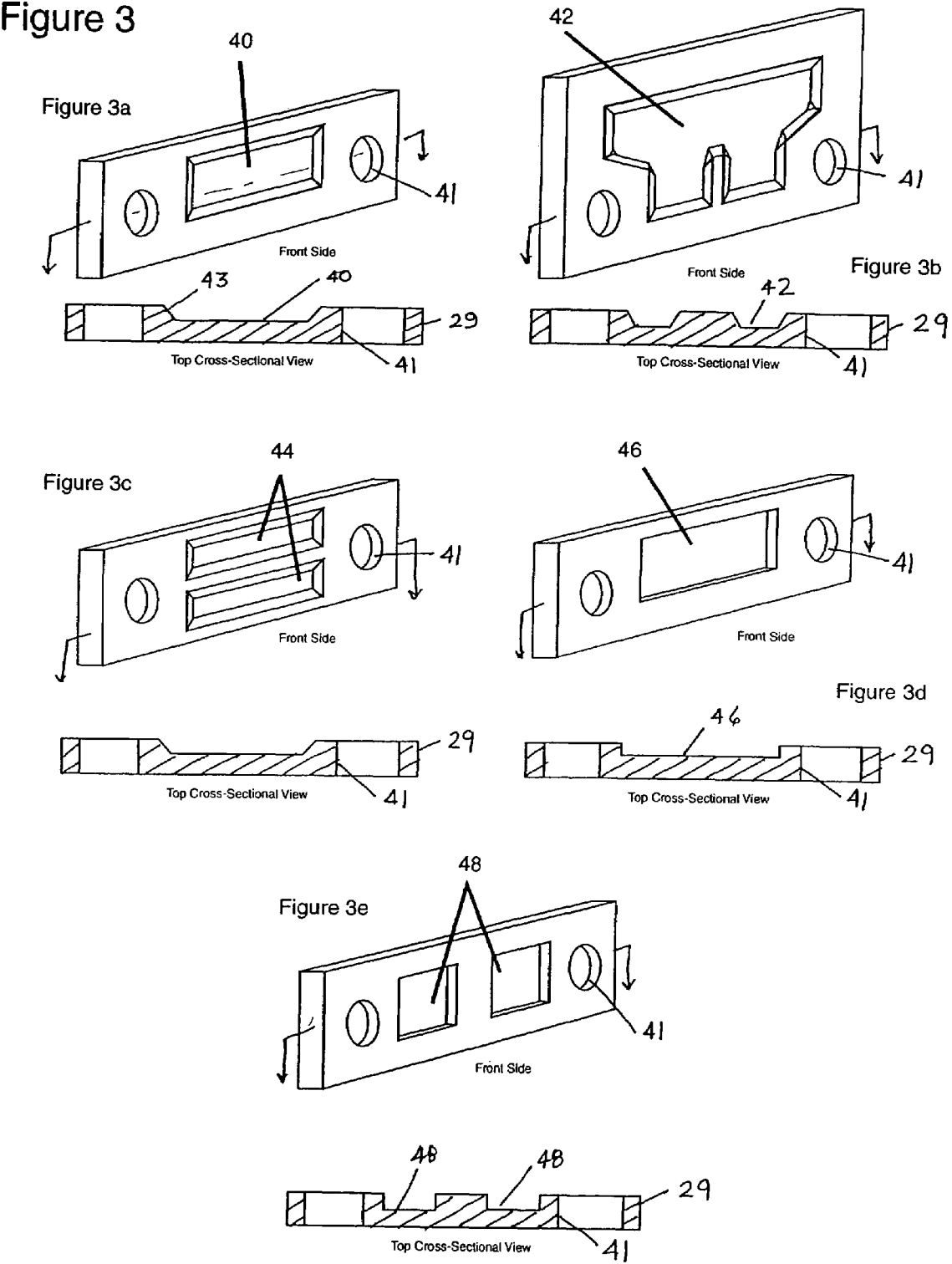
FIGS. 3a through 3e illustrate various embodiments of the machined or formed trench in a substrate.

FIG. 3 illustrates the various embodiments of the trench formed in the substrate 29 with alignment holes 41. FIG. 3*a* illustrates a rectangular trench 40 having beveled sides 43 that shows the configuration of the trench if the substrate would be <100> silicon (or formed by means of a mold) and wet anisotropic etching machined the trench. This embodiment 40 also illustrates a smaller trench footprint for later illustration. The trench 42 in FIG. 3*b* illustrates another trench formed or machined in the same manner as 40, but allowing for two separate optoelectronic device chips to be placed on the substrate along the direction of the width of the substrate due to the configuration of trench 42 which is also formed with beveled sides. Double trenches 44 in FIG. 3*c* are formed or machined in the same manner as 40, but allow for two separate optoelectronic device chips to be placed in a parallel fashion on the substrate along the direction of the height of the substrate. The rectangular trench 46 in FIG. 3*d* illustrates the machining or forming of a trench in a different manner—if the substrate would be silicon (or formed by means of a silicon mold) and deep reactive ion etching or DRIE machined the trench (or formed by means of a mold), or if the substrate would be silicon (or formed by means of a mold) and wet anisotropic etching machining the trench which would be a parallelogram. Such a trench does not have beveled sides as shown. The two trenches 48 illustrated in FIG. 3*e* are formed or machined in the same manner as 46, but allow for two separate optoelectronic device chips to be placed on the substrate along the direction of the width of the substrate. Not pictured is the option of the embodiment of a trench formed or machined in the same manner as 46, but allowing for two separate optoelectronic device chips to be placed on the substrate along the direction of the height of the substrate.

The optoelectronic device can be placed within the trench with its active area facing out of or into or along the surface plane of the substrate.

Figure 4:
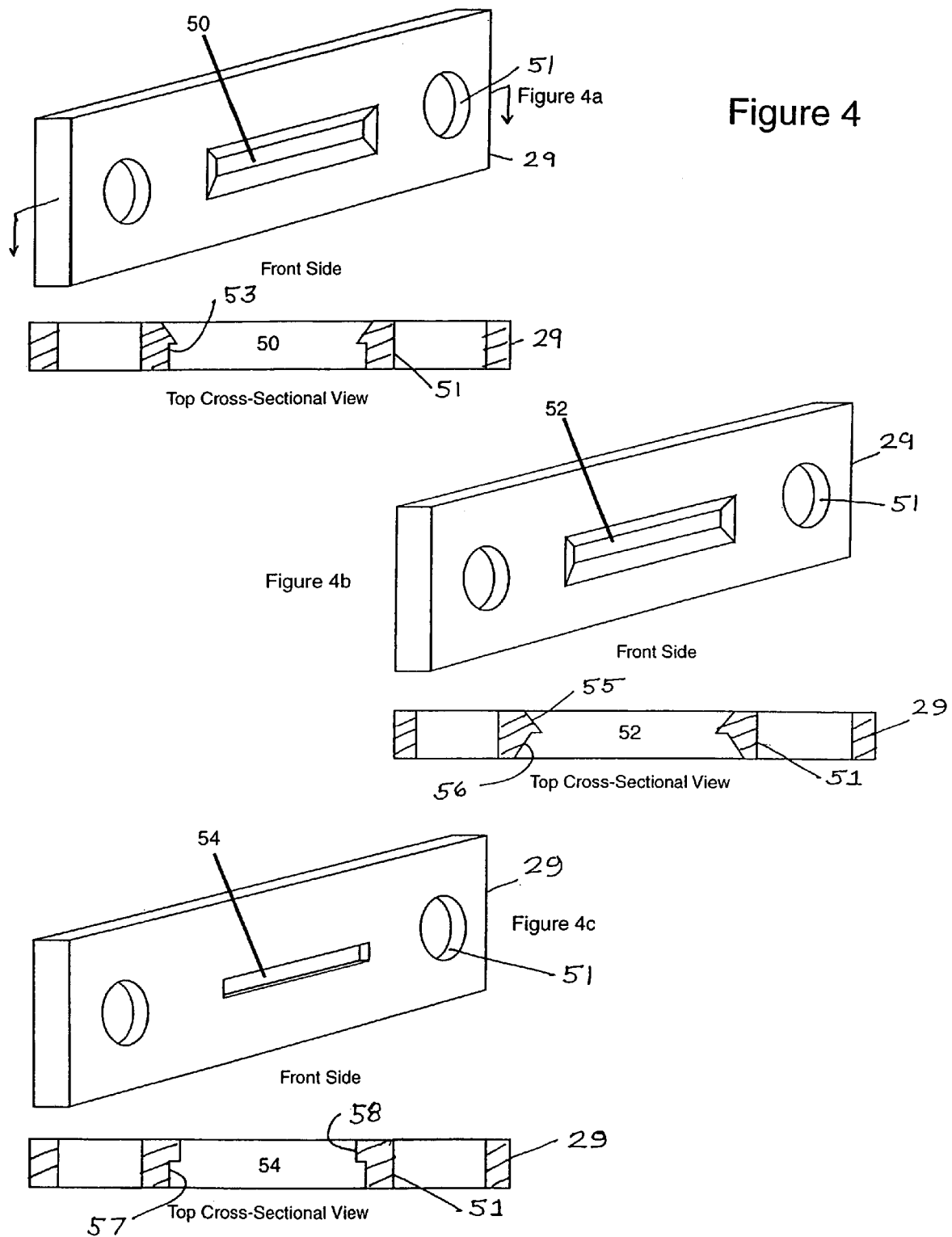
FIGS. 4a through 4c illustrate various embodiments of machined or formed trenches in the back surface of a substrate for the optoelectronic device to be placed face-first within.

FIG. 4 illustrates the various embodiments of trenches formed or machined in the substrate for placement of the optoelectronic device into the back surface of the substrate, where the active area faces into the substrate and a window is cut out on the front surface for the active area to show through. Windows are not necessary for wavelengths for which the substrate is transparent to the optoelectronic device. Trench 50 in FIG. 4*a* illustrates the use of wet anisotropic etching to machine the resultant front trench if the substrate would be <100> silicon (or formed by means of a <100> silicon mold) and the use of DRIE (or formed by means of the same mold) to form the back trench that aligns and houses the optoelectronic device. The result forms a lip 53 which acts as a stop to maintain an optoelectronic device in place and parallel to the disposition of the substrate 29. Trench 52 in FIG. 4*b* illustrates the use of wet anisotropic etching to machine the resultant front and back trench if the substrate would be silicon (or formed by means of a silicon mold). The result is a beveled front trench 55 and a beveled rear trench 56 which form a lip as shown to provide a guide and stop to hold a component in place. Trench 54 in FIG. 4*c* illustrates the use of DRIE in the back and front of the substrate (or formed using a mold for the substrate) to provide both trenches, the front trench having an inner surface 58 and the rear trench having a back surface 57 which provide an alignment and stop lip to secure a component in place. Not shown is bonding the active device to the back side without a machining a trench for the device.

Figure 5:
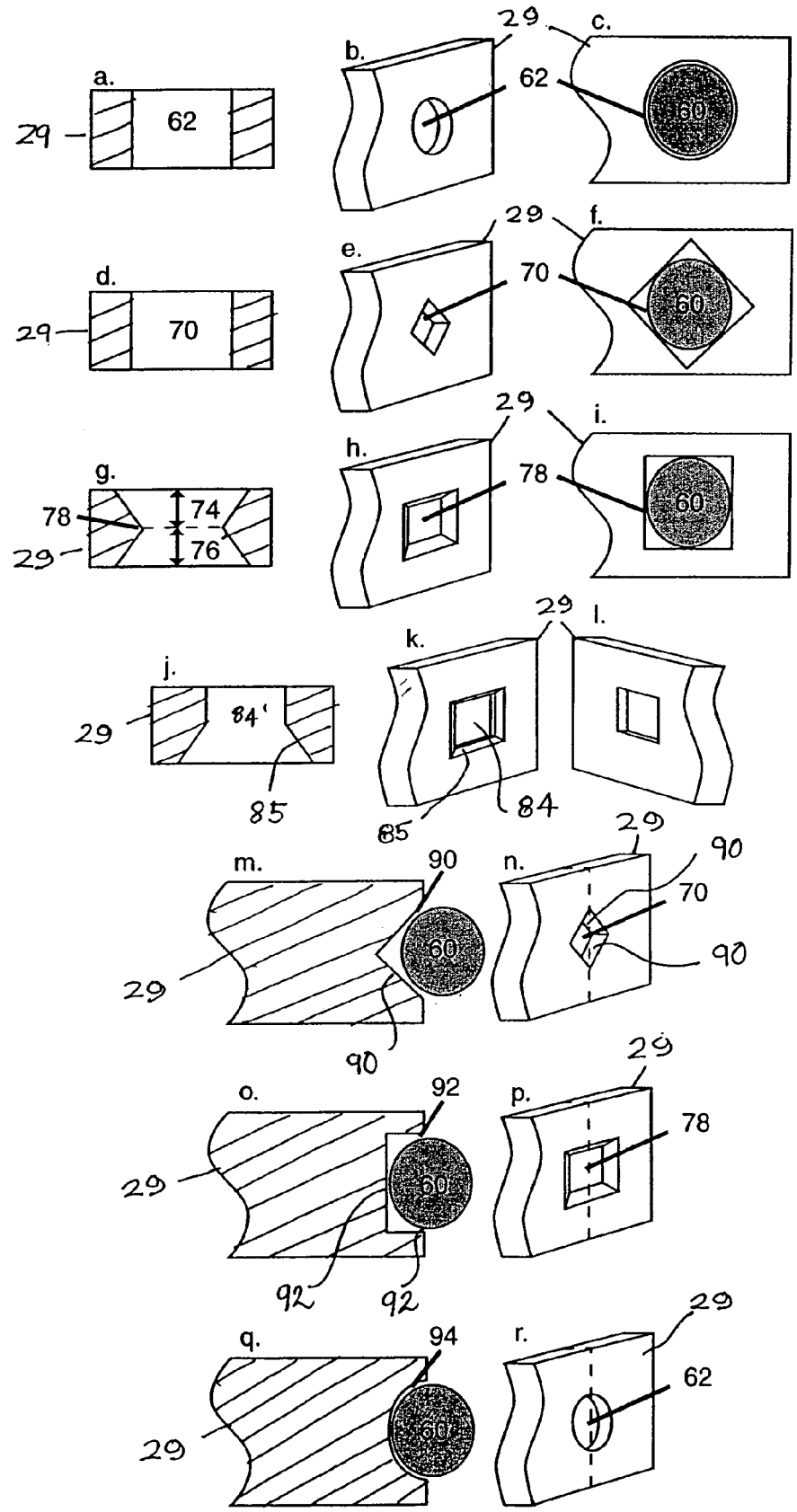
FIGS. 5a through 5r illustrate variously shaped through holes which allow for alignment by pins or other cylindrical alignment mechanism.

FIG. 5 illustrates the various embodiments of the via holes machined or formed into the substrate 29 to provide for alignment to pins or alignment tools. A cut-away side view of a circular hole embodiment is pictured in FIG. 5*b* with a top cross-sectional view provided in FIG. 5*a*. This hole 62 is formed or machined via DRIE or laser drilling. The hole 62 is viewed face-on in FIG. 5*c* with a pin 60 aligned within its edges. A cut-away side view of a diamond shaped hole embodiment 70 is pictured in FIG. 5*e* with a top cross-sectional view provided in FIG. 5*d*. The hole 70 is viewed face-on in FIG. 5*f* with a pin 60 aligned with four points of contact. The hole can be formed or can be machined via DRIE or laser drilling or using a wet anisotropic etch if the substrate material is <100> silicon and the angle of each of the hole's edges is 45° off the major flat angle. The square, straight-walled hole can be machined 45° rotated from what is pictured in 70 if the substrate is <110> silicon. A cut-away side view of a square shaped hole embodiment 78 is pictured in FIG. 5*h* with a top cross-sectional view provided in FIG. 5*g*. The hole 78 is viewed face-on in FIG. 5*i* with a pin 60 aligned with four points of contact. The hole 78 can be formed or can be machined using a wet anisotropic etch. The hole 78 can be formed by entirely etching through the front side 74 of the wafer 29, entirely etching through the back side 76 of the wafer 29, or any combination of depths of either. A front cut-away side view of a square shaped hole embodiment 84 with beveled edges 85 in the front is pictured in FIG. 5*k* and a back cut-away side view of a square shaped hole embodiment is pictured in FIG. 5*l*, with a top cross-sectional view provided in FIG. 5*j* showing the straight and beveled sides 85. One side of the hole 84 can be formed or can be machined using a wet anisotropic etch, while the other can be formed or can be machined using DRIE or laser drilling. As illustrated in FIG. 5*n*, a diamond shaped hole 70 can be cut to provide two points of contact 90 for pin 60 alignment as in the face-on view FIG. 5*m*. As illustrated in FIG. 5*p*, a square hole may be cut to provide three points of contact 92 for pin 60 alignment as shown in the face-on view FIG. 5*o*. The multiple points of contact provide alignment and centering functions and, when mated back together, form four points of contact with a circular guide pin 60. As illustrated in FIG. 5*r*, a circular hole may be cut to provide an arc of contact 94 for pin 60 alignment as shown in FIG. 5*q*. Such an arc contact provides for a press fit of the pin 60 within the hole 62 on substrate 29.

Figure 6:
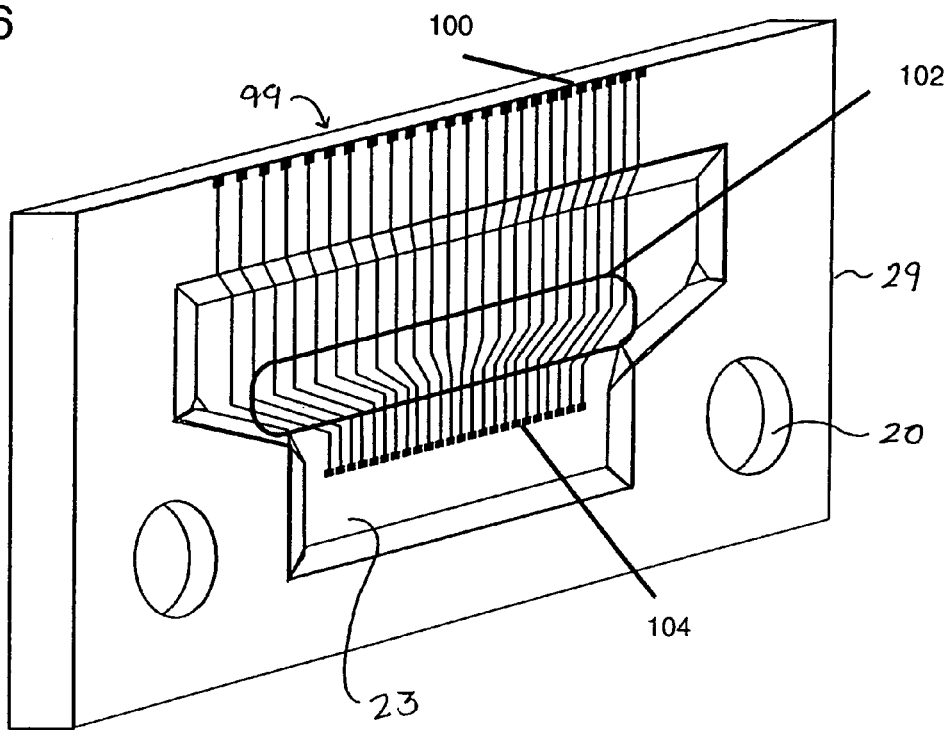
FIG. 6 illustrates metallized circuit traces and bond pads on a substrate.

FIG. 6 illustrates an electrically conductive circuit 99 deposited onto or selectively diffused in the substrate 29 with its trench 23 and holes 20. This circuit can provide bond pads 104 for ball wire bonds to the optoelectronic device and/or its drivers. The circuit fans out at 102 to provide easier access to the top bond pads 100. The circuit can include ground plane circuits between signal carrying circuits to provide less crosstalk between signals.

Figure 7:
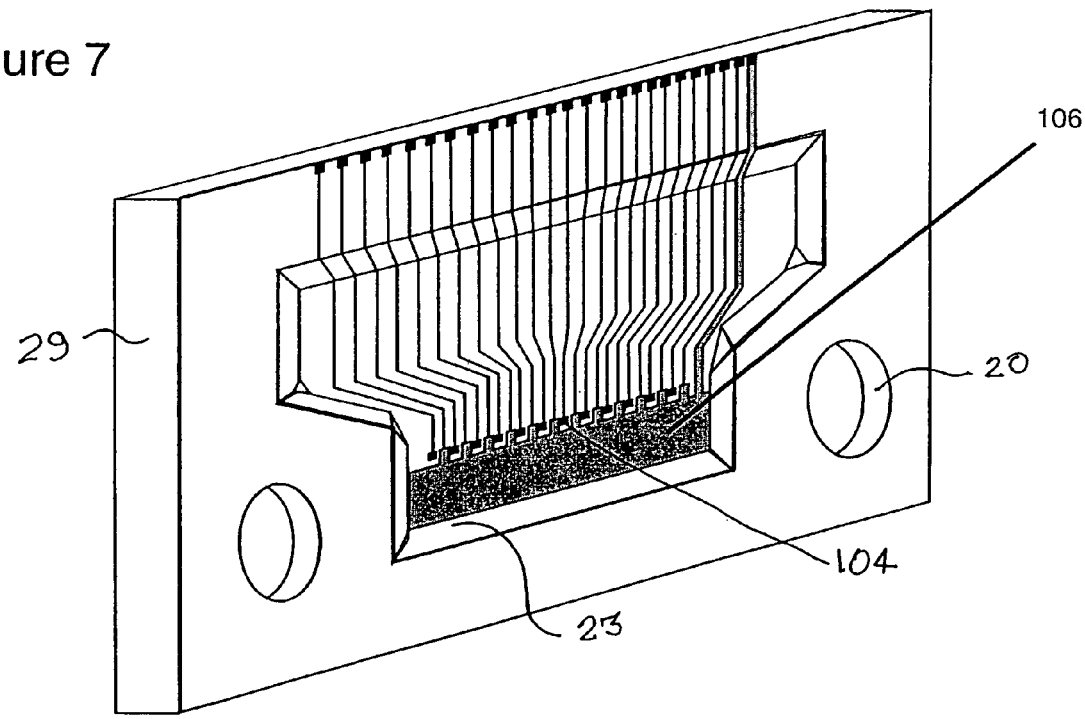
FIG. 7 illustrates the addition of a solder eutectic pad and trace on a substrate.

FIG. 7 illustrates an electrically conductive solder pad 106 to allow for flip chip or direct bonding of the optoelectronic device and/or drivers to the substrate 29 with its holes 20 and trench 23. Patterned solders may be made to reflow to provide for alignment of the device with its bottom pads 104 within the trench, or the trench walls used for the alignment.

Figure 8:
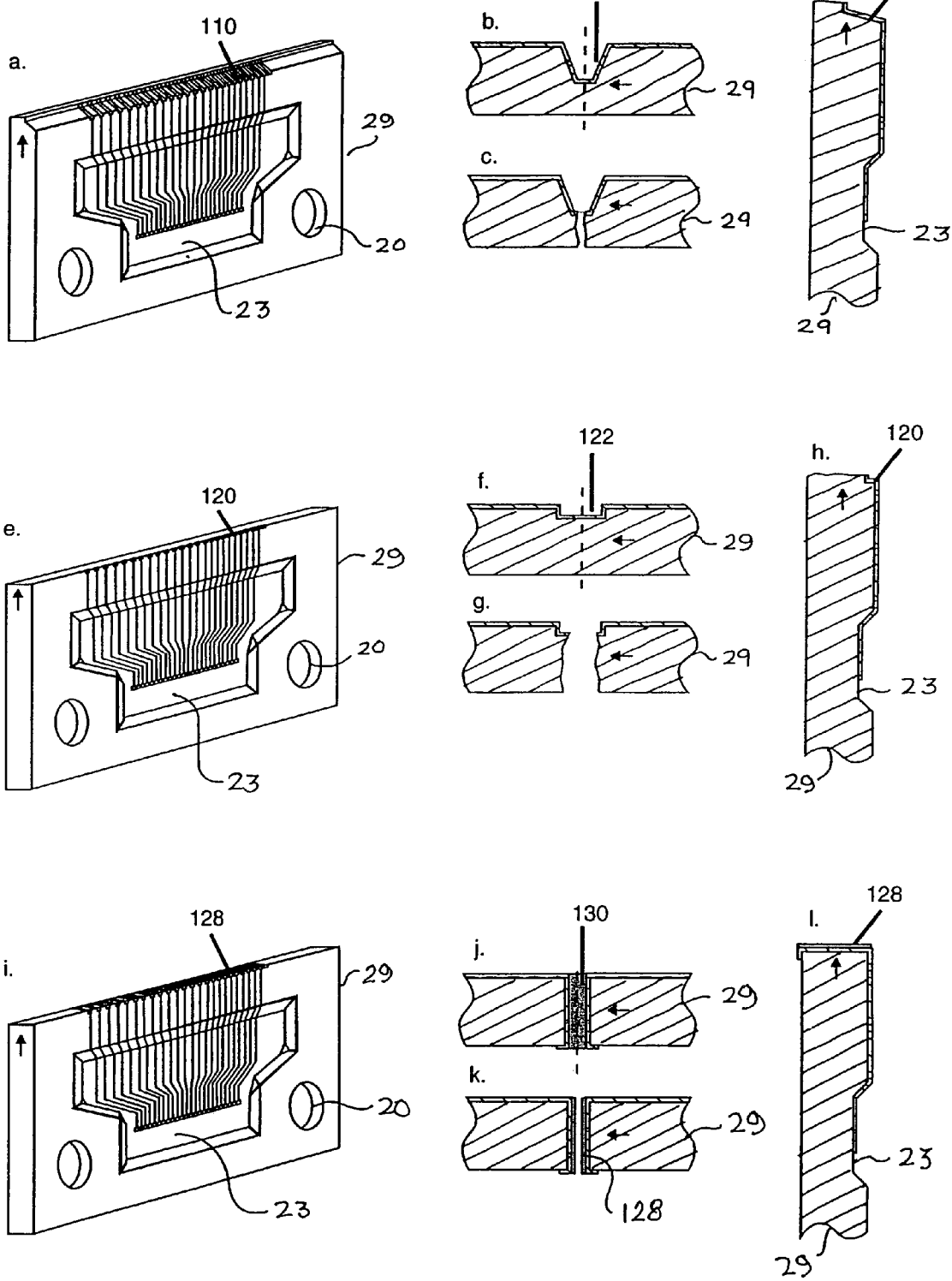
FIGS. 8a, 8e and 8i illustrate various ways to achieve perpendicular circuit access on the edge of a substrate, with FIGS. 8b, 8c and 8d representing cross-sectional features of FIG. 8a, FIGS. 8f, 8g and 8h representing cross-sectional features of FIG. 8*b* and FIGS. 8*j*, 8*k* and 8*l* representing cross-sectional features of FIG. 8*l*, as shown.

FIG. 8 illustrates various embodiments of the substrate providing for perpendicular and backside access to the circuits on or embedded in the front surface of the substrate 29 with its holes 20 and trench 23. In the circuits illustrated in FIG. 8*a*, the edge conductors 110 are formed by anisotropic etching of silicon or forming of some other material into the v-shaped trough 114 and depositing an electrical conductor on or diffusing a conductive layer into the surface. The substrate can then be cut to form two pieces as in FIG. 8*c*, one of which becomes the chip shown in side cross-sectional view in FIG. 8*d* with a sloped trough for receiving the array circuit. The edge connection 110 provides perpendicular access to the optoelectronic device's circuits. In the circuits illustrated in FIG. 8*e*, the edge conductors 120 are formed by anisotropic etching of silicon or DRIE or laser drilling of the substrate material or forming of some other material into the rectangular trough shape 122 and depositing an electrical conductor on or diffusing a conductive layer into the surface. The substrate can then be cut to form two pieces as is shown in FIG. 8*g*, one of which becomes the chip as is shown in side cross-sectional view in FIG. 8*h* as a notched trough. The edge connection 120 provides perpendicular access to the optoelectronic device's circuits. In the circuits illustrated in FIG. 8*i*, the edge metallizations 128 are formed by DRIE through the substrate material or forming of some other material into the shape 130 and depositing an electrical conductor on into the surface. The substrate is then cut to form two pieces as is shown in FIG. 8*k*, one of which becomes the chip as is shown in side cross-sectional view in FIG. 8*l* with its concave troughs for termination of the array circuit. The edge connection 128 provides perpendicular and backside access to the optoelectronic device's circuits.

Figure 9:
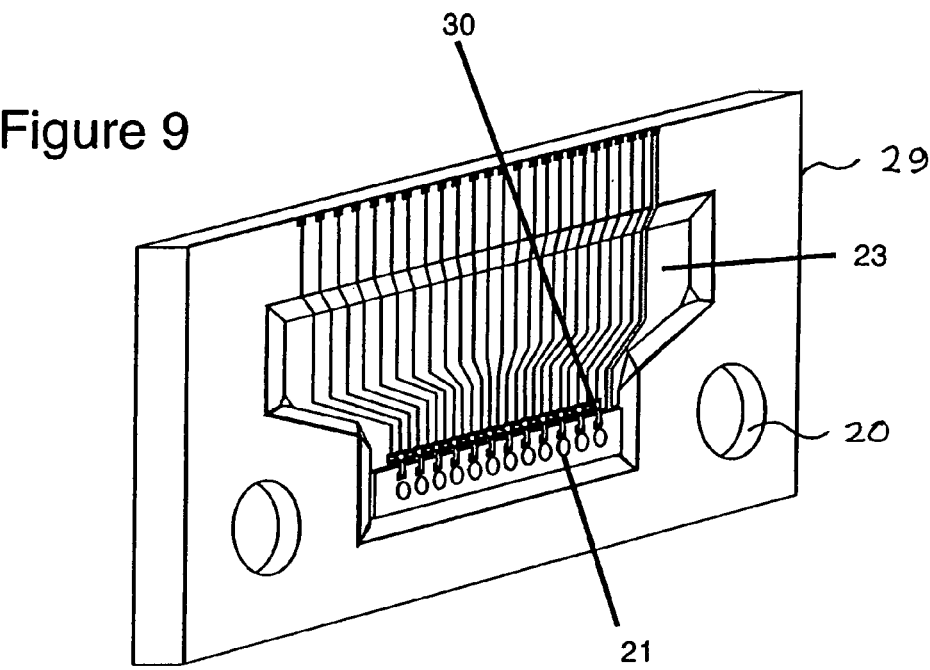
FIG. 9 illustrates the placement of the optoelectronic device in its alignment trench along with ball wire bonds to metallized pads on the surface of a substrate.

FIG. 9 illustrates the alignment and bonding of the optoelectronic device 21 into the alignment trench 23 of substrate 29. The shape of the trench, with its beveled sides, receives the device and aligns it at the same time, eliminating the need for further alignment. Ball wire bonds 30 affix the electrical connections on the front face of the device 21 to the bond pads in or on the substrate's surface.

Figure 10:
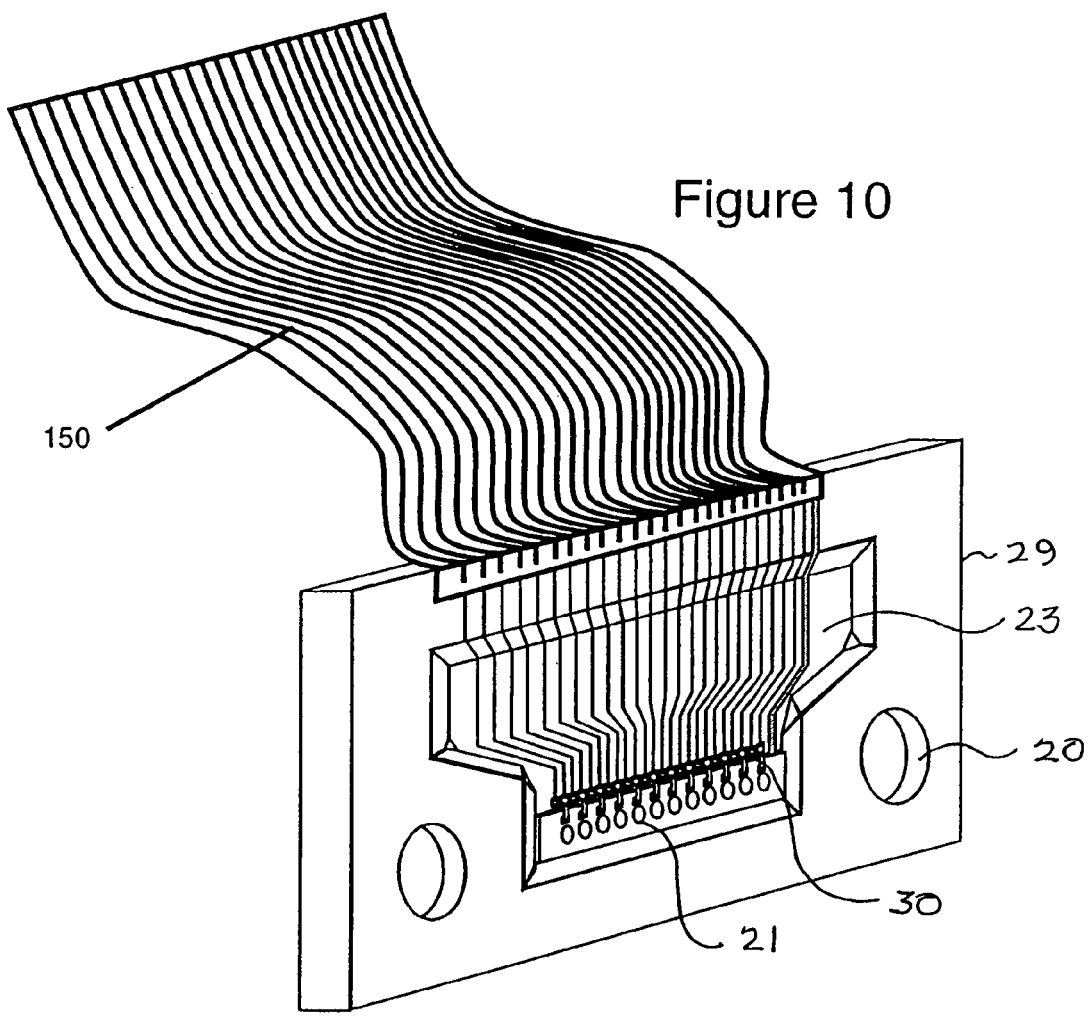
FIG. 10 illustrates the use of a flexible circuit as a means to access the electrical circuit on a substrate.

FIG. 10 illustrates the use of "flex" circuitry ISO connected to the edge circuit of the array to carry the electrical signals away from the substrate in a protective flexible conductor. The flex circuitry may be connected to the top edge circuit by any of the means heretofore described.

Figure 11:
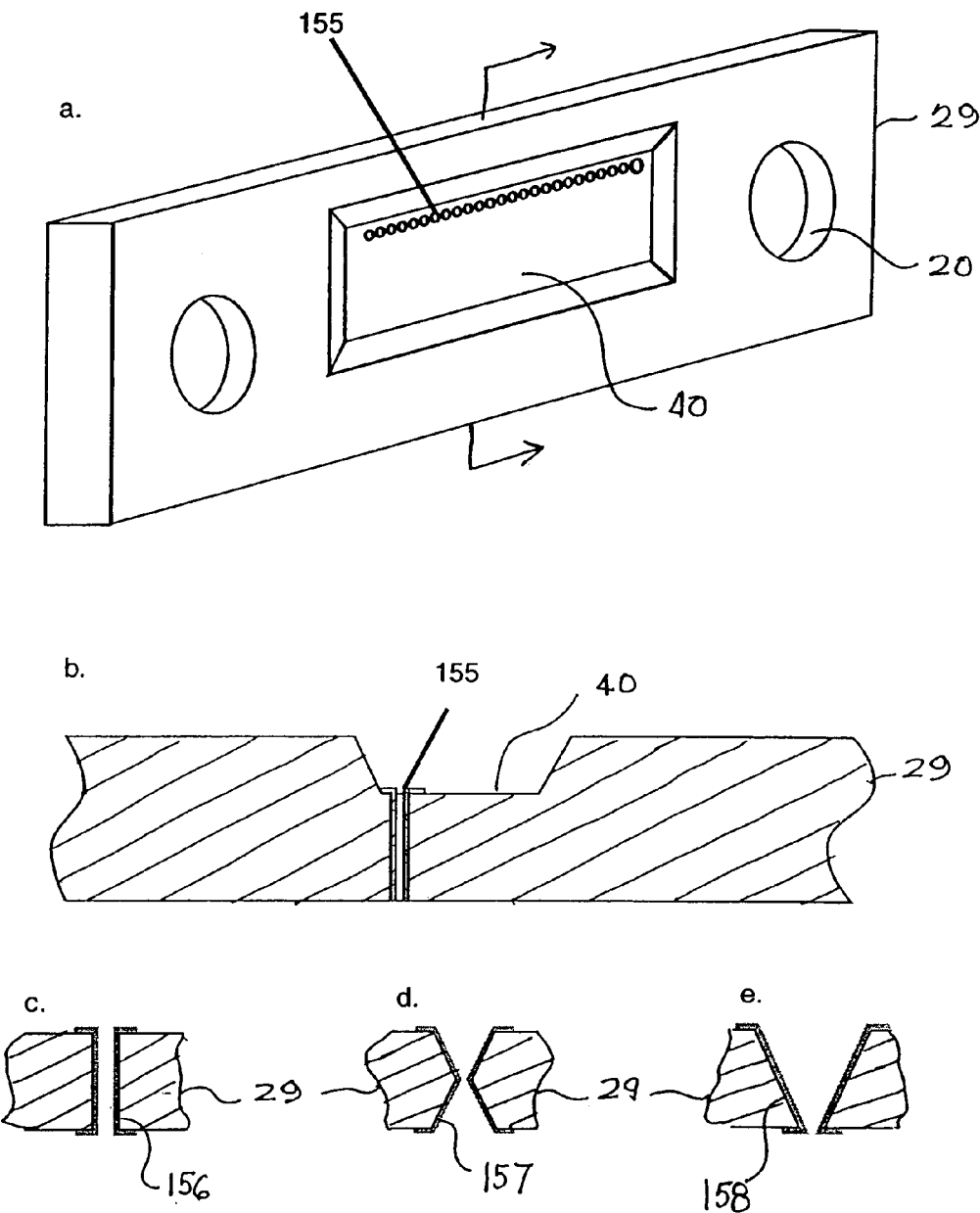

FIG. 11 illustrates the use of via holes 155 to carry the electrical connections for the optoelectronic device to the back surface of the substrate 29 with its rectangular trench 40. FIG. 11*a* illustrates a cut-away side view, while FIG. 11*b* illustrates a cross-sectional side view. Various embodiments of the via holes with conductive layers are shown in FIGS. 11*c*-*e*. The embodiment of a straight hole 156 shown in FIG. 11*c* can be formed or can be machined by DRIE or laser drilling. The embodiment shown in FIG. 11*d* with its hourglass shaped hole 157 can be formed or can be machined by a combination of wet anisotropic etches into silicon, one on the back surface and one on the front surface. The embodiment shown in FIG. 11e with its tapered hole 158 can be formed or be machined by wet anisotropic etch on one surface of a <100> silicon substrate. It should be noted that such deep holes could be made to house optical fibers perpendicular to the surface and that such holes could be made in an array for an opposing chip which would be used to form an independent fiber to fiber or fiber to device connection system.

Figure 12:
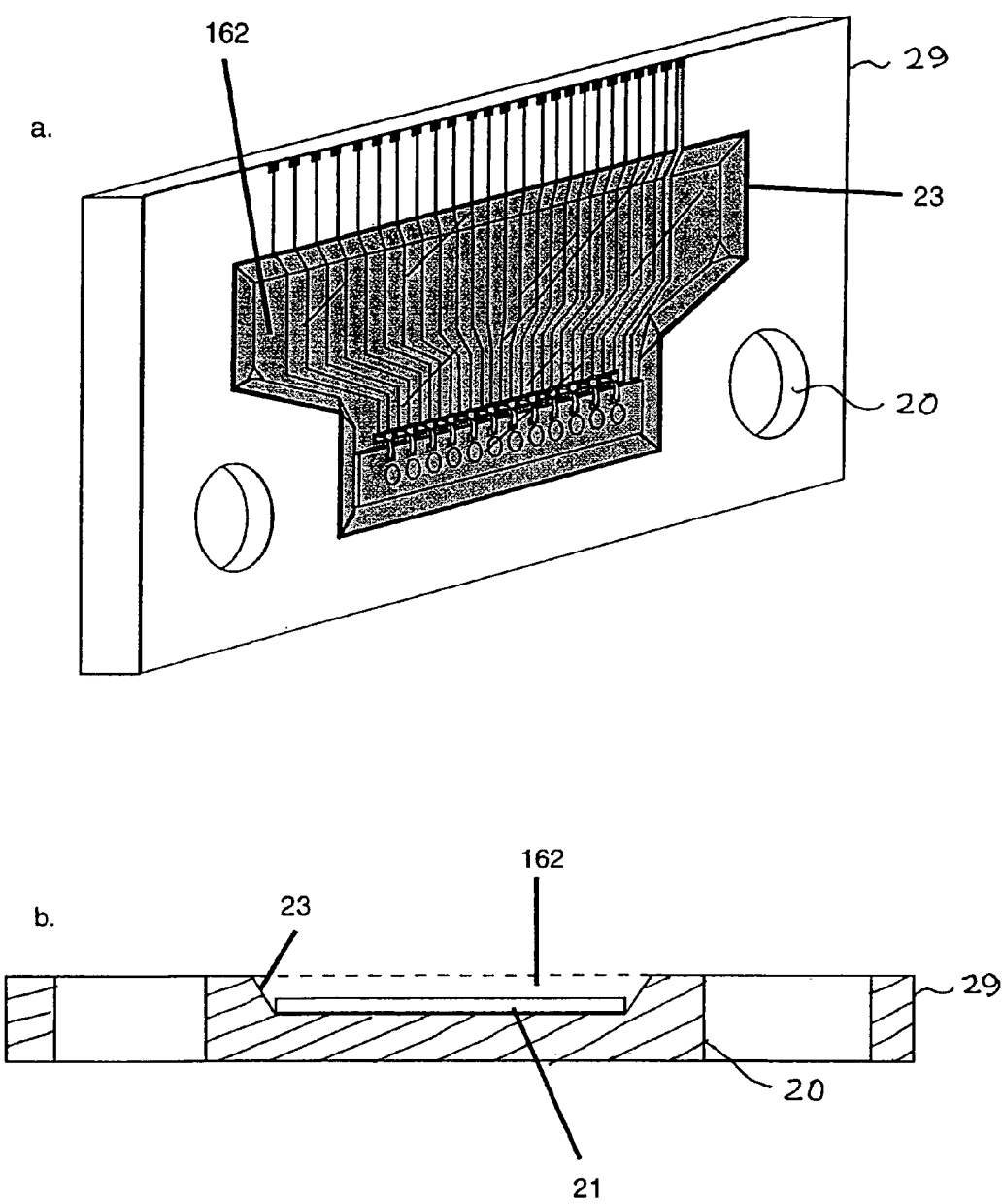
FIG. 12*a* illustrates the injection of a known volume and subsequent curing of an encapsulant that comes flush to the surface of the trench that houses the optoelectronic device.
FIG. 12*b* shows a top view of the substrate of FIG. 12*a*.

FIG. 12 illustrates the injection of a known precise quantity of encapsulant 162 to fill flush to the surface of the alignment trench 23. In FIG. 12a, a cut-away side view of the substrate with circuit traces, solder, optoelectronic device, and encapsulant 162 is shown. The side cross-sectional view FIG. 12b illustrates the flat surface achieved by molding the encapsulant 162 flush to the surface of the substrate and curing it.

Figure 13:
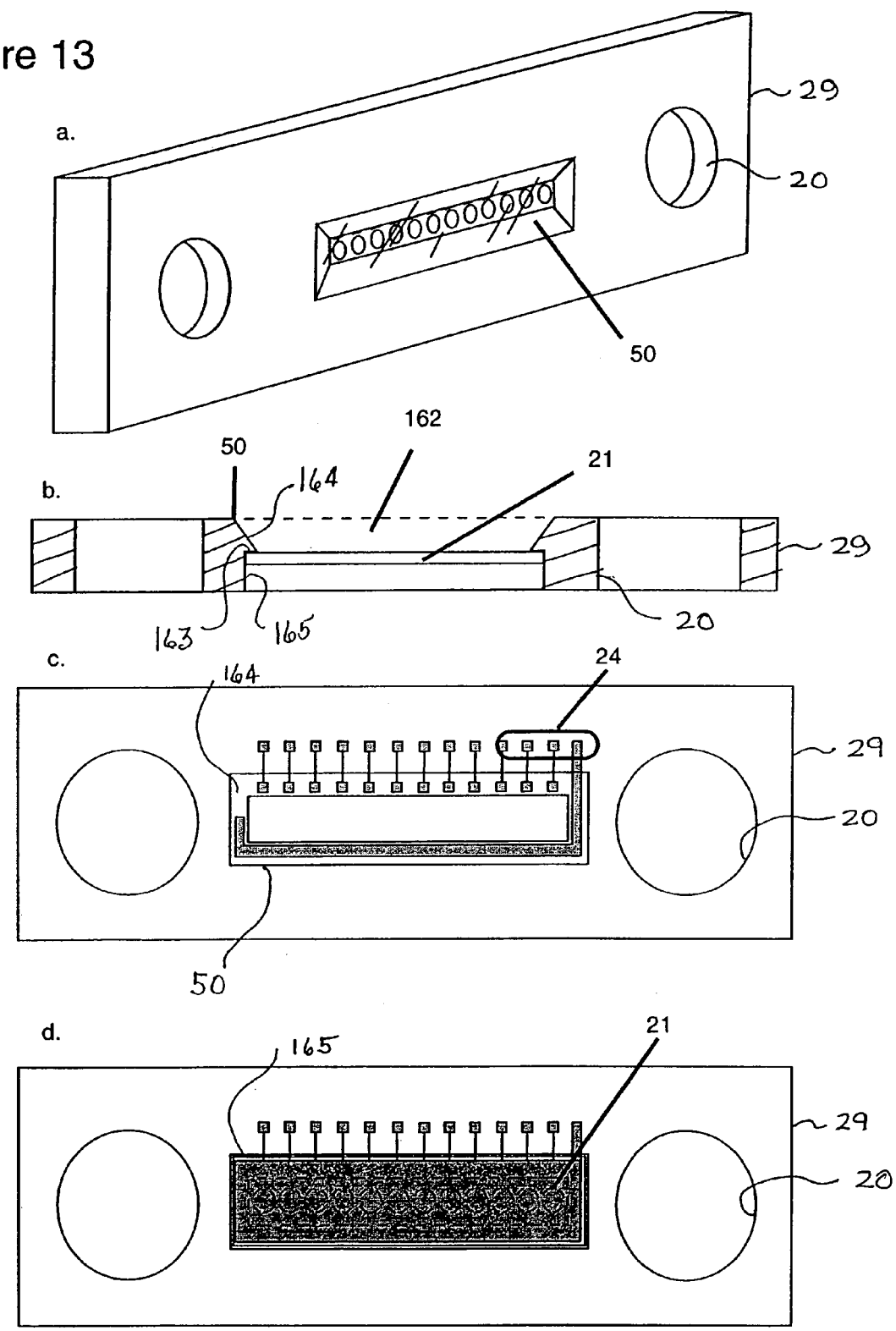
FIG. 13*a* illustrates a different embodiment of the substrate, where the optoelectronic device alignment trench is on the back side of the substrate, and where the device's active area shows through an open window on the front side
FIGS. 13*b* show a top view of the substrate of FIG. 13*a*.
FIGS. 13*c* and 13*d* show the metallization and encapsulation for the substrate of FIG. 13*a*.

FIG. 13 illustrates the method by which an optoelectronic device is fitted into the substrate 29 through the back surface trench as defined in 50, FIG. 4a. The device 21 is fitted face-first into the back surface trench of 50 as in the top cross-sectional view FIG. 13b. In FIG. 13c, the back surface face-on view illustrates the conductive circuit traces and solder bond pads 24 for the device 21. In FIG. 13d, the back surface face-on view illustrates the device 21 in place with its back facing out and its active area facing into the substrate. The lip 163 formed by the intersection of bevel 164 and straight side 165 holds device 21 in place in an aligned position.

FIG. 14 illustrates embodiments of the molded encapsulant face to include, but not to limited to, optical elements like lenses and mirrors on a substrate 29. In FIG. 14a, a lens 180, made of a rounded protrusion, spreads the light L coming out of the optoelectronic device 21 if 21 is a light emitting device, or 180 focuses the light L coming into the device 21 if 21 is a light receiving device. In FIG. 14b, the device 186 is a light emitting device like a VCSEL, LED, or SLED, while the device 188 is a light receiving device like a PIN diode. A portion of the light transmitted from 186 reflects off of angular surface 182 into the active area 188, where it is detected. This configuration is useful for monitoring the power of 186. The angle of surface 182 can be calculated to provide for the correct amount of reflected light to impinge upon 188.

Figure 15:
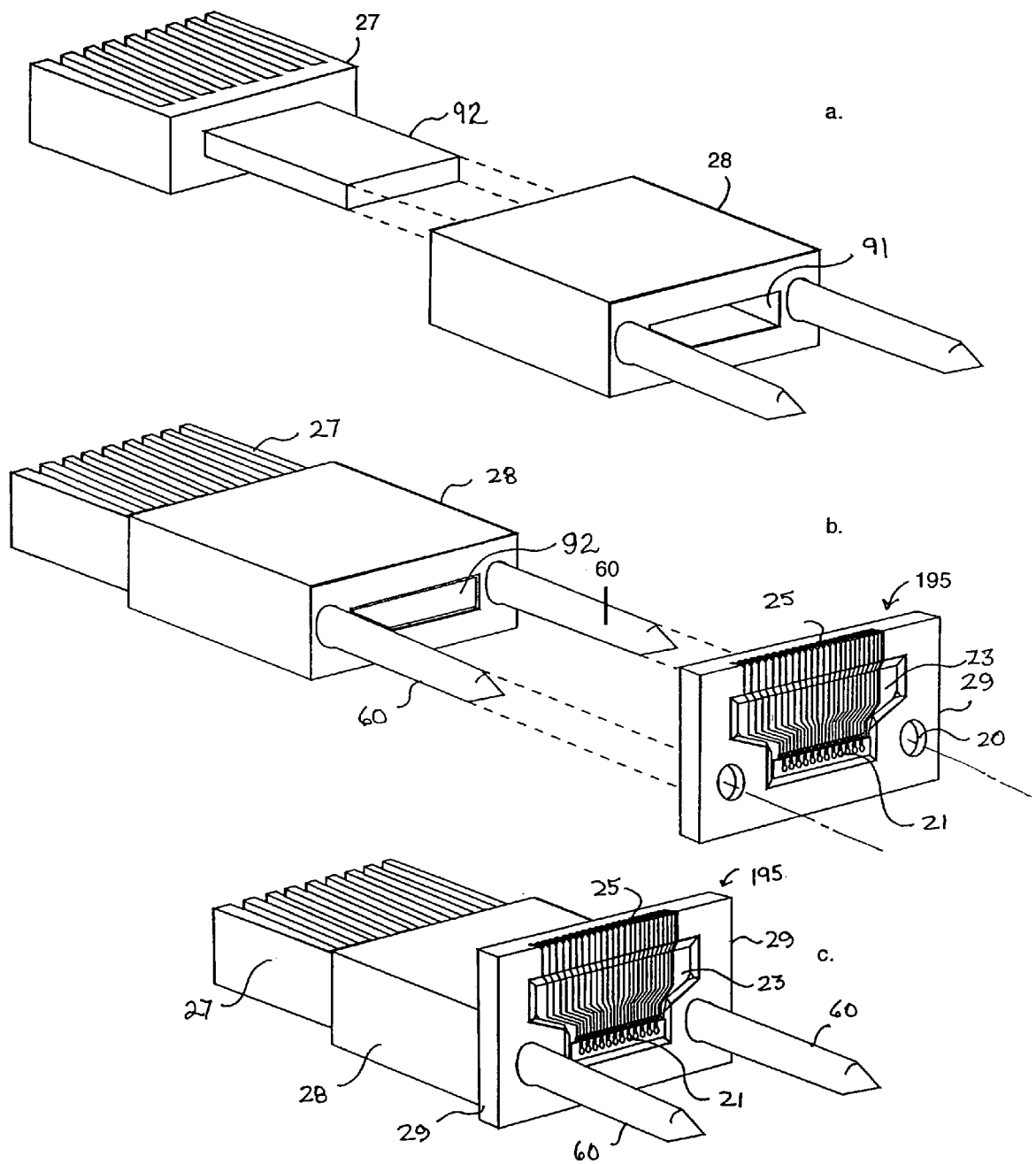
FIGS. 15*a* through 15*c* illustrate the method by which a heat sink is placed within an optical connector housing and how the substrate and device subassembly can be simply aligned to the same connector housing—allowing coupling to the connector housing's mating optical connector.

FIG. 15 illustrates the fashioning of an optical connector housing 28 that has the same spacing and alignment as a mating connector with fibers or waveguides embedded in it. The optical connector housing 28 has alignment pins 60. It also has a feature such as slot 91 that accepts a protrusion 92 on heat sink 27 into its body so that the optoelectronic device on the substrate 29 can thermally conduct through it. In FIG. 15a, the connector housing 28 and the heat sink 27 are displayed separately. In FIG. 15b, the heat sink and the housing have been assembled, and the optoelectronic coupler subassembly 195 is displayed separately. In FIG. 15c, all the parts have been assembled. The subassembly 195 and the heat sink 27 would be affixed to the connector housing 28, but the pins 60 could be removed once the assembly 195 is bonded in place. The device is ready for connection via solder bumps 25 to an array, a circuit, drivers or the like.

Figure 16:
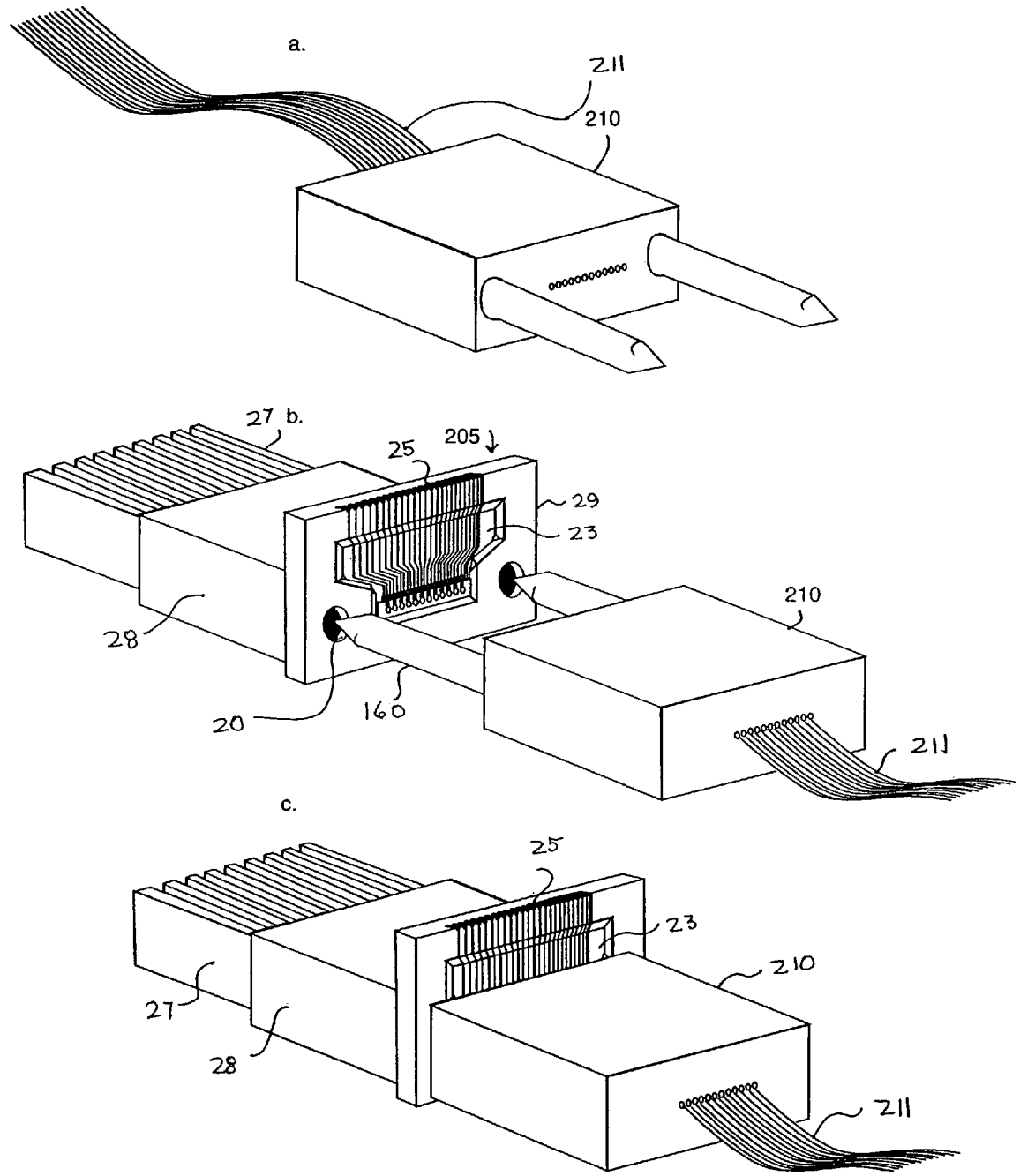
FIGS. 16*a* through 16*c* illustrate the alignment and connection of a fiber optic array connector to a subassembly.

FIG. 16 illustrates, in FIGS. 16a, 16b and 16c the sequence of coupling of a fiber optic array connector 210 to the optoelectronic subassembly 205. The guidepins 60 used to align substrate 29 and component 28 have been removed as the two pieces were bonded. The fiber optic array connector 210 with its flex cord 211 has pins 160 which in turn are inserted into holes 20 of substrate 29 which previously received pins 60 for alignment purposes prior to bonding. Once 210 is inserted into holes 20 the device can be considered complete or it is further bonded together.

The invention herein allows for a large degree of wafer integration. It allows for the use of etching to provide for passive alignment of components within an assembly of components. A large plus to this invention is the utilization of existing components, such as those shown in FIGS. 15 and 16 as 28 and 210 respectively, in the subassembly. This negates the need for expensive manufacture of all new components to achieve this positive passive alignment while at the same time providing a superior platform for the technology. The invention allows for direct bonding of the device to the carrier or other component and for solder or patterned metallizations in the recesses. This allows for flip-chip bonding of pads on the active device to the carrier.

It also allows for possible ground plane metals extending between the traces to help prevent crosstalk in the final module. It also allows for connection to flex (metal conductors in/on a flexible medium) at a distance where there is no interference from the other connector or functions on the face.

The ability to accurately construct the trenches also allows for disposition of a known amount of transparent (can be non-transparent if other optical paths are chosen) encapsulant can be injected to form optical surface. It also allows for the insertion of a filter or other optical elements. This can incorporate coatings to change the reflectivity and transmission such as bandwidth, etc. The use of encapsulant protects against damage due to abrasion, water, and dust to the wire bonds. It is possible to emboss or otherwise shape the encapsulant to form a singular or array of small lenses to optimally couple the light in and out of the system. These can deflect the light to photodiodes to monitor the output of the light. Transparent slides can be inserted into the encapsulant to alter the light transmission qualities thereof.

The silicon wafers can be etched using wet or dry processes. The apertures can be metallized to pass signals from one side of the carrier to the other side. The use of CVD metal deposition and physical vapor deposition at a tilted or variable incident angle is also contemplated. Holes can be etched though the wafers or substrates using isotropic or anisotropic etching giving perpendicular access allowing subsequent metallization of the trenches. The trenches can be filled with solder for connection to another substrate or board and can have pass through connections as described herein from both the edge perpendicular and the opposite side. I.e, the holes can be etched so as to pass electrical connections up to the top edge of the substrate as well as to the opposite side. The etching provides for passive alignment features both in the trench and the holes. A heat sink can be attached to the component with the active portion extending away from the heat generating device which enhances the operation of the sink.

The use of the guide pins and alignment system allows the component to serve as a one time alignment guide to fiber array ferrules which utilizes the mechanics of the fiber array for subsequent matings. The system also allows for board to board free space optical connection. Components having integrated ICs can be connected up as well.

An important consideration is that many of the steps in providing the components are integrated at the wafer level which allows for huge cost savings to be made. This allows also for greater thickness in face plates and requiring only minor changes to be made to the housings which connect and aligns the two ferrules.

Where the operation of devices is 1200 to 1600 nm, the carrier (substrate) is transparent the devices may be mounted facing the carrier in a etched recess. If the carrier is not transparent the cut-out section may be etched so as to be in communication with the trench. In such a case a non-transparent encapsulant may be utilized.

Having shown and described the invention in its many incarnations it will be obvious to those of ordinary skill in the art that many changes and modifications can be made without departing from the scope of the appended claims

What is claimed is:

1. An optoelectronic component, comprising:
a silicon substrate;
an optoelectronic device mounted on the silicon substrate;
an encapsulant over the optoelectronic component; and
a flexible circuit attached to the silicon substrate and electrically connected to the optoelectronic device.

2. The optoelectronic component of claim 1, wherein the silicon substrate has a trench in a first surface thereof and the optoelectronic device is disposed in the trench.

3. The optoelectronic component of claim 1, wherein the flexible circuit is attached to the silicon substrate along an edge of the substrate.

4. The optoelectronic component of claim 1, wherein the silicon substrate has a via hole therethrough.

5. The optoelectronic component of claim 1, comprising a plurality of the optoelectronic devices.

6. An optoelectronic component, comprising:
a silicon substrate having a micromachined feature;
an optoelectronic device mounted on the silicon substrate; and
a flexible circuit attached to the silicon substrate and electrically connected to the optoelectronic device.

7. The optoelectronic component of claim 6, wherein the micromachined feature is a via hole through the silicon substrate.

8. The optoelectronic component of claim 7, wherein the silicon substrate has a trench in a first surface thereof and the optoelectronic device is disposed in the trench.

9. The optoelectronic component of claim 7, wherein the flexible circuit is attached to the silicon substrate along an edge of the substrate.

10. The optoelectronic component of claim 6, wherein the micromachined feature is a trench formed in a first surface of the silicon substrate, and the optoelectronic device is disposed in the trench.

11. The optoelectronic component of claim 10, wherein the flexible circuit is attached to the silicon substrate along an edge of the substrate.

12. The optoelectronic component of claim 6, comprising a plurality of the optoelectronic devices.

13. An optoelectronic component, comprising:
a silicon substrate;
a plurality of optoelectronic devices mounted on the silicon substrate; and
a flexible circuit attached to the silicon substrate and electrically connected to the optoelectronic devices.

14. The optoelectronic component of claim 13, wherein the silicon substrate has a trench in a first surface thereof and the optoelectronic devices are disposed in the trench.

15. The optoelectronic component of claim 13, wherein the flexible circuit is attached to the silicon substrate along an edge of the substrate.

16. The optoelectronic component of claim 13, wherein the silicon substrate has a via hole therethrough.

* * * * *